(12) United States Patent
Ye et al.

(10) Patent No.: US 11,282,242 B2
(45) Date of Patent: Mar. 22, 2022

(54) SCATTER CORRECTION FOR POSITRON EMISSION TOMOGRAPHY (PET)

(71) Applicant: KONINKLIJKE PHILIPS N.V., Eindhoven (NL)

(72) Inventors: Jinghan Ye, Livermore, CA (US); Xiyun Song, Cupertino, CA (US); Chuanyong Bai, Solon, OH (US); Andriy Andreyev, Willoughby Hills, OH (US); Chi-Hua Tung, Aurora, OH (US); Zhiqiang Hu, Twinsburg, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 43 days.

(21) Appl. No.: 16/963,343

(22) PCT Filed: Jan. 24, 2019

(86) PCT No.: PCT/EP2019/051801
§ 371 (c)(1),
(2) Date: Jul. 20, 2020

(87) PCT Pub. No.: WO2019/149621
PCT Pub. Date: Aug. 8, 2019

(65) Prior Publication Data
US 2021/0375009 A1 Dec. 2, 2021

Related U.S. Application Data

(60) Provisional application No. 62/624,155, filed on Jan. 31, 2018.

(51) Int. Cl.
*G06T 11/00* (2006.01)

(52) U.S. Cl.
CPC ........ *G06T 11/005* (2013.01); *G06T 2210/41* (2013.01)

(58) Field of Classification Search
CPC .. G06K 9/6257; G06N 3/0454; G06T 7/0012; G06T 11/005; G01T 1/1642; G01T 7/00;
(Continued)

(56) References Cited

U.S. PATENT DOCUMENTS

2005/0072929 A1 4/2005 Chuang
2011/0058722 A1 3/2011 Hu
(Continued)

OTHER PUBLICATIONS

International Search report and written opinion of PCT/EP2019/051801 dated Apr. 23, 2019.
(Continued)

*Primary Examiner* — Phuoc H Doan

(57) ABSTRACT

A non-transitory computer-readable medium stores instructions readable and executable by a workstation (18) including at least one electronic processor (20) to perform an image reconstruction method (100). The method includes: generating, from received imaging data, a plurality of intermediate images reconstructed without scatter correction from data partitioned into different energy windows; generating a fraction of true counts and a fraction of scatter events in the generated intermediate images; generating a final reconstructed image from the intermediate images, the fraction of true counts in the intermediate images, and the fraction of scatter counts in the intermediate images; and at least one of controlling the non-transitory computer readable medium to store the final image and control a display device (24) to display the final image.

20 Claims, 6 Drawing Sheets

(58) Field of Classification Search
CPC ......... A61B 6/03; A61B 6/5282; A61B 6/461; A61B 6/037; G16H 30/20
See application file for complete search history.

(56) References Cited

U.S. PATENT DOCUMENTS

| | | | |
|---|---|---|---|
| 2015/0146952 | A1 | 5/2015 | Hashizume |
| 2017/0046857 | A1 | 2/2017 | Ye |
| 2017/0061629 | A1* | 3/2017 | Zhu .................. G06K 9/00 |
| 2019/0059827 | A1* | 2/2019 | Nye ................. A61B 6/4035 |

OTHER PUBLICATIONS

Wu, Jay et al. "Scatter correction for 3D PET using beam stoppers combined with dual-energy window acquisition: a feasibility study; Scatter correction using beam stoppers", Physics in Medicine and Biology, vol. 50, No. 19, 2005, pp. 4593-4607.

Ferreira, N.C. et al "A hybrid scatter correction for 3D PET based on an estimation of the distribution of unscattered coincidences; implementation on the ECAT EXACT HR$plus$", Physics in Medicine and Biology, vol. 47, No. 9, May 2002, pp. 1555-1571.

Adam, Lars-Eric et al "Energy-based Scatter Correction for 3-D PET Scanners using NaI(TI) Detectors", IEEE Transactions on Medical Imaging, vol. 19, No. 5, May 2000.

K.S. Chuang et al. "Novel Scatter correction for three-dimensional positron emission tomography by use of a beam stopper device" Nuclear Instruments & Methods in Physics Research, vol. 551, No. 2-3, Oct. 2005, pp. 540-552.

Zaidi, Habib "Comparative Evaluation of scatter correction techniques in 3D positron emission tomography", European Journal of Nuclear Medicine, vol. 27, No. 12, Dec. 2000.

Bendriem, B. et al. "A PET Scatter Correction using Simultaneous Acquisitions with Low and High Lower Energy Thresholds", IEEE Transactions 1994.

Popescu, Lucretiu M. et al. "PET energy-based scatter estimation and image reconstruction with energy-dependent corrections" Physics in Medicine and Biology, vol. 51, pp. 2919-2937, 2006.

* cited by examiner

SCATTER CORRECTION FOR POSITRON EMISSION TOMOGRAPHY (PET)

CROSS-REFERENCE TO PRIOR APPLICATIONS

This application is the U.S. National Phase application under 35 U.S.C. § 371 of International Application No. PCT/EP2019/051801, filed on Jan. 24, 2019, which claims the benefit of U.S. Provisional Patent Application No. 62/624,155, filed on Jan. 31, 2018. These applications are hereby incorporated by reference herein.

FIELD

The following relates generally to the medical imaging arts, medical image interpretation arts, image reconstruction arts, and related arts.

BACKGROUND

In positron emission tomography (PET) imaging, scattered coincidences sometimes contribute a significant proportion to the total detected coincidences. The scatter coincidences should be corrected for during PET reconstruction. Currently, a single-scatter simulation (SSS) method is widely used for the purpose of scatter correction in PET. The method simulates the scatter distribution by calculating the probability that the pair of coincidence gammas undergo a single scattering event before being detected. SSS alone does not determine the relative amount of scatter contribution to the total detected coincidences.

The relative amount of scatter contribution is typically determined by a tail-fitting method or a Monte Carlo simulation based method. When the tail-fitting based method is used for scatter estimation, the resulting image may have quite significant artifacts sometimes, such as in the cases if the patient encountered motion between computed tomography (CT) and PET scans, or if the patient is large so that the tail part has high noise or truncation, or random correction is not accurate for the tail part so that the scatter estimate accuracy is compromised. With the Monte Carlo simulation scatter amount estimate, although artifacts due to noise in the tail part are no longer an issue, scatter contribution from out-of-axial-field of view (FOV) activities cannot be accurately estimated for single-bed acquisition or end bed frames since the out-of-axial FOV activity is unknown.

The following discloses new and improved systems and methods to overcome these problems.

SUMMARY

In one disclosed aspect, a non-transitory computer-readable medium stores instructions readable and executable by a workstation including at least one electronic processor to perform an image reconstruction method. The method includes: generating, from received imaging data, a plurality of intermediate images reconstructed without scatter correction from data partitioned into different energy windows; generating a fraction of true counts and a fraction of scatter events in the generated intermediate images; generating a final reconstructed image from the intermediate images, the fraction of true counts in the intermediate images, and the fraction of scatter counts in the intermediate images; and at least one of controlling the non-transitory computer readable medium to store the final image and control a display device to display the final image.

In another disclosed aspect, a non-transitory computer-readable medium storing instructions readable and executable by a workstation including at least one electronic processor to perform an image reconstruction method. The method includes: generating, from received imaging data, a plurality of intermediate images reconstructed without scatter correction from data partitioned into different energy windows; generating a fraction of true counts and a fraction of scatter counts in the generated intermediate images by operations including: generating an energy histogram of the imaging data; fitting the energy histogram to a one-dimensional true counts energy distribution and a one-dimensional scatter counts energy distribution; and generating the fraction of true counts and the fraction of scatter counts based on the fitted one-dimensional true counts and scatter counts distributions forward-projecting the scatter estimate image to generate a scatter projections estimate; reconstructing the final image from the imaging data with scatter correction using the scatter projections estimate; and at least one of controlling the non-transitory computer readable medium to store the final image and control a display device to display the final image.

In another disclosed aspect, a non-transitory computer-readable medium storing instructions readable and executable by a workstation including at least one electronic processor to perform an image reconstruction method. The method includes: generating, from received imaging data, a plurality of intermediate images reconstructed without scatter correction from data partitioned into different energy windows; generating a fraction of true counts and a fraction of scatter counts in the generated intermediate images by simulating acquisition of the acquired imaging data from an estimated true image with an energy distribution having a known contribution of true and scatter counts to the energy windows; forward-projecting the scatter estimate image to generate a scatter projections estimate; reconstructing the final image from the imaging data with scatter correction using the scatter projections estimate; and at least one of controlling the non-transitory computer readable medium to store the final image and control a display device to display the final image.

One advantage resides in providing an accurate estimate of scatter contribution in imaging data.

Another advantage resides in reducing artifacts in imaging data.

Another advantage resides in reconstructing images with scatter compensation.

Another advantage resides in providing a scatter estimate that incorporates the out-of-axial-FOV scatter contribution.

Another advantage resides in providing a scatter estimate utilizing accurate fitting of the energy spectra of true and scatter coincidences.

Another advantage resides in providing a scatter estimate utilizing fitting of the energy spectra of true and scatter coincidences to estimate to improve estimation of the different scatter content of low energy window (LEW) versus high energy window (HEW) reconstructed images.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

FIG. 1 diagrammatically shows image reconstruction system according to one aspect.

DETAILED DESCRIPTION

The following relates to an improved scatter correction in PET imaging, which leverages the expectation that if the data are divided into lower and higher energy partitions then the lower energy partition should contain more scatter than the higher energy partition. This is because any inelasticity of a scatter event translates to a loss of energy from the scattered 511 keV gamma ray, whereas scatter is not likely to add energy to the gamma ray.

To provide a practical scatter estimation from this insight, the following uses an approach of: (i) generating a high energy window (HEW) image and a low energy window (LEW) image; (ii) generating a scatter estimate image from the HEW and LEW images; (iii) forward projecting the scatter estimate image to generate a scatter projections estimate; and (iv) performing high resolution image reconstruction using the scatter projections estimate.

Operation (iii) may suitably employ any conventional forward projection step while operation (iv) may suitably employ any known approach to provide scatter correction in high resolution iterative PET reconstruction given a scatter estimates. Thus, operation (iv) may, for example, employ a reconstruction algorithm incorporating a scatter projections estimate of a type used for incorporating single scatter simulation (SSS).

In some embodiments, the PET imaging data are divided into the HEW and LEW and step (i) starts with a fast (e.g. low resolution) reconstruction is used to generate an initial HEW image. The HEW image is input to a Monte Carlo simulator which generates true and scatter event samples and computes the fractions or ratios $r_T$ of true events in the HEW image versus the LEW image and $r_S$ of scatter events in the HEW image versus the LEW image. These ratios may be computed on a per-pixel basis, optionally with a constraint enforcing an expected slow spatial variation of these ratios. The computed ratios $r_T$ and $r_S$ are then used to complete step (ii) by generating a scatter estimate from the HEW and LEW images. Optionally, the computed ratios $r_T$ and $r_S$ may instead be fed back to refine the true estimate image and thereby improve the Monte Carlo sampling via one or more iterative repetitions before pulling out the final scatter estimate image.

In other embodiments, the ratios $r_T$ and $r_S$ are derived from fitted curves to the energy spectra of true and scatter coincidences and the true estimate image and the scatter estimate image are then generated from the LEW and HEW images given the ratios. In this case no Monte Carlo simulation is performed.

In further embodiments, the Monte Carlo simulation approach is employed as above, except that a high resolution iterative image reconstruction is employed in generating the HEW and LEW images, so that the resulting scatter estimate image may be forward projected and applied directly to correct the HEW image for scatter to generate the final clinical image.

Figure 1:
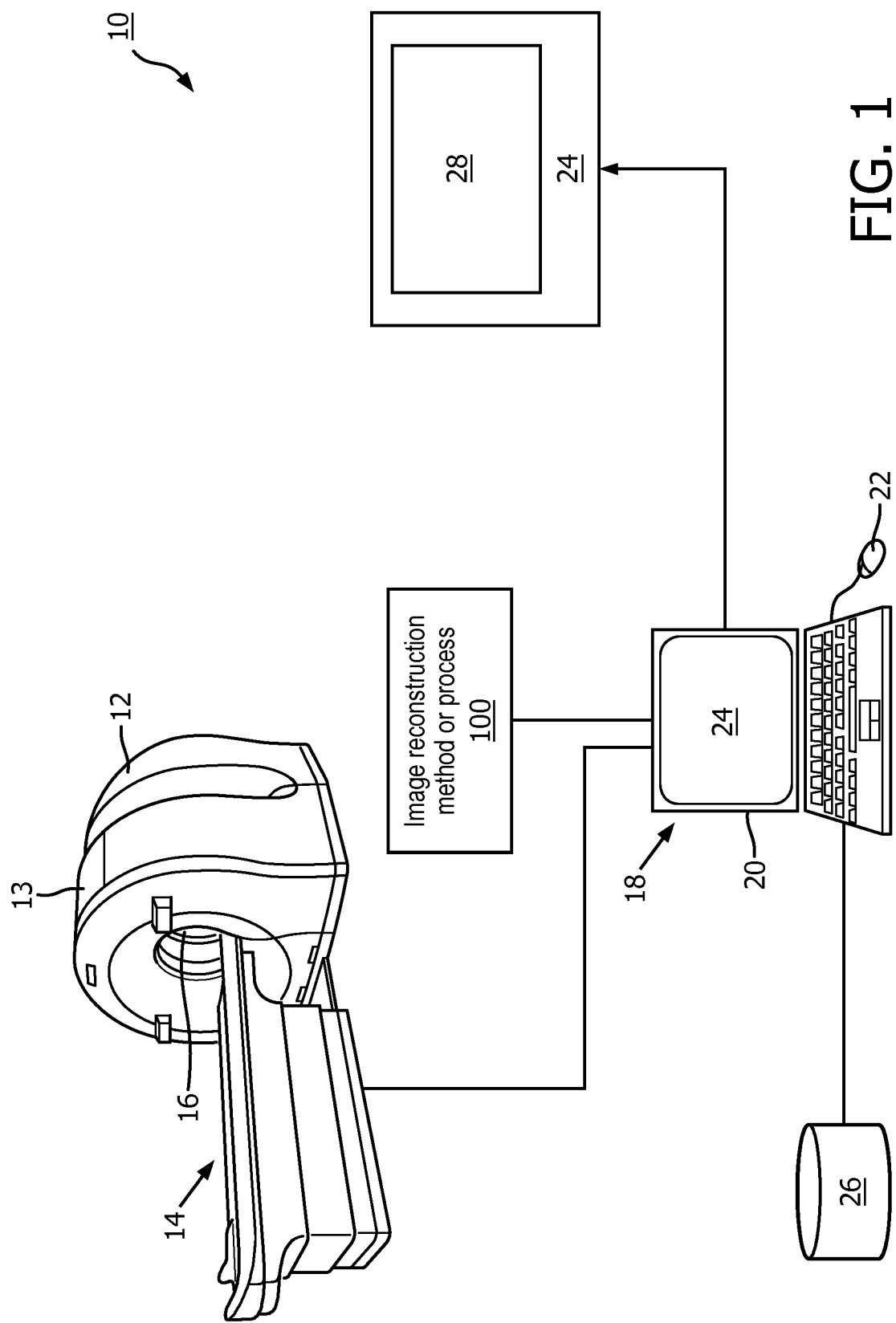

With reference to FIG. 1, an illustrative medical imaging system 10 is shown. As shown in FIG. 1, the system 10 includes an image acquisition device 12. In one example, the image acquisition device 12 can comprise a PET gantry of a PET/CT imaging system that further includes a computed tomography (CT) gantry 13. In other examples, the image acquisition device 12 can be a standalone PET scanner without a CT component. A patient table 14 is arranged to load a patient into an examination region 16 of the PET gantry 12 or CT gantry 13. In other embodiments, the image acquisition device 12 can comprise a gamma camera of a single photon emission computed tomography (SPECT) device, which can also comprise a component of a SPECT/CT imaging system that includes the CT gantry 13.

The system 10 also includes a computer or workstation or other electronic data processing device 18 with typical components, such as at least one electronic processor 20, at least one user input device (e.g., a mouse, a keyboard, a trackball, and/or the like) 22, and a display device 24. In some embodiments, the display device 24 can be a separate component from the computer 18. The workstation 18 can also include one or more non-transitory storage media 26 (such as a magnetic disk, RAID, or other magnetic storage medium; a solid state drive, flash drive, electronically erasable read-only memory (EEROM) or other electronic memory; an optical disk or other optical storage; various combinations thereof; or so forth). The display device 24 is configured to display a graphical user interface (GUI) 28 including one or more fields to receive a user input from the user input device 22.

The at least one electronic processor 20 is operatively connected with the one or more non-transitory storage media 26 which stores instructions which are readable and executable by the at least one electronic processor 20 to perform disclosed operations including performing an image reconstruction method or process 100 which incorporates scatter estimation and correction as disclosed herein. In some examples, the image reconstruction method or process 100 may be performed at least in part by cloud processing.

Figure 2:
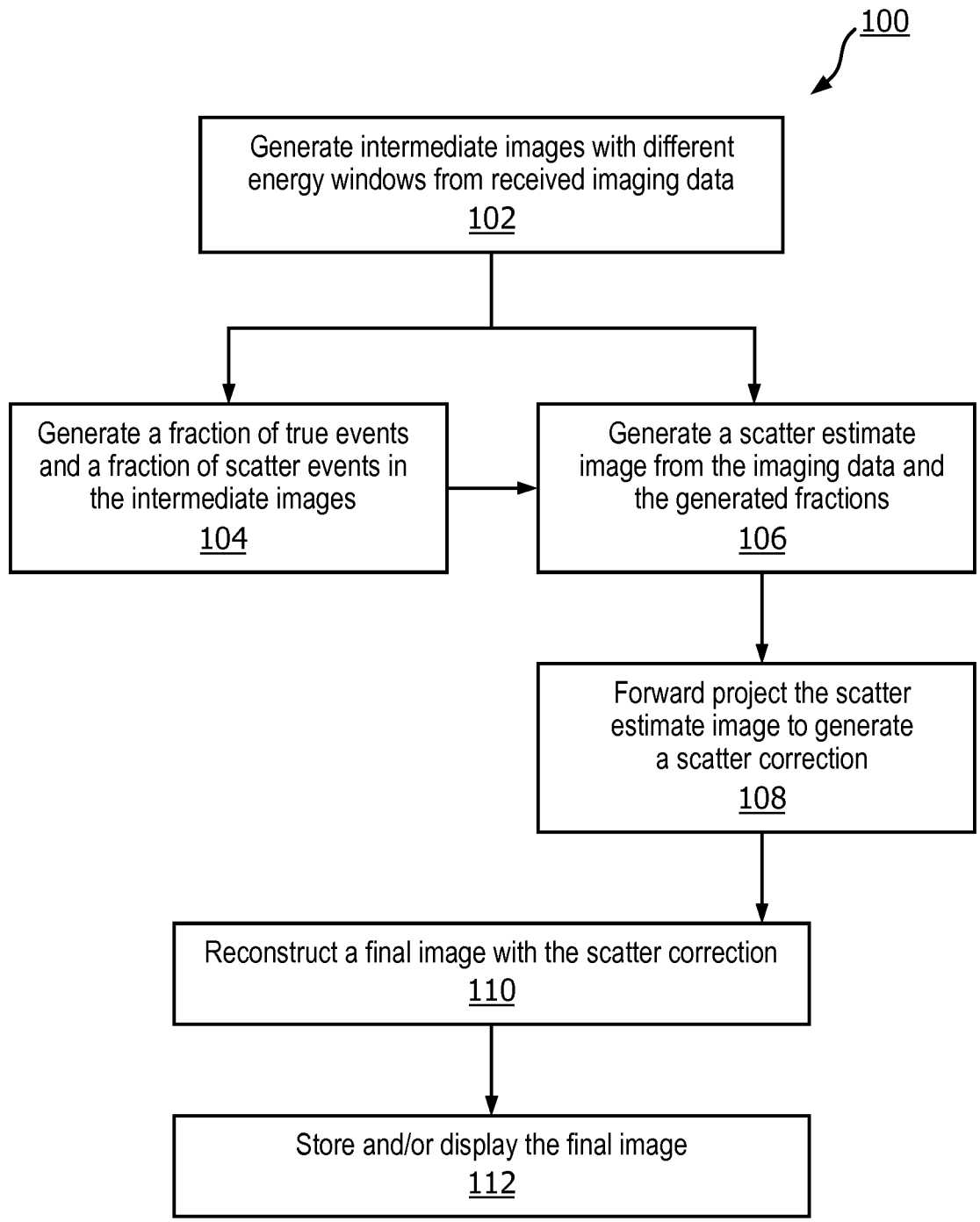
FIG. 2 shows an exemplary flow chart operation of the system of FIG. 1.

With reference to FIG. 2, an illustrative embodiment of the image reconstruction method 100 is diagrammatically shown as a flowchart. To begin the process, the image acquisition device 12 is configured, or controlled by the at least one electronic processor 20, to acquire imaging data. At 102, the at least one electronic processor 20 is programmed to generate, from the received imaging data, a plurality of intermediate images reconstructed without scatter correction from data partitioned into different energy windows. In one embodiment, the image acquisition device 12 comprises the PET imaging device, and is configured, or controlled by the at least one electronic processor 20, to acquire PET imaging data. The at least one electronic processor 20 is programmed to separate the PET imaging data into a low energy window (LEW) image reconstructed without scatter correction from counts of the PET imaging data, and imaging data that is greater than 511 keV into a high energy window (HEW) image reconstructed without scatter correction from counts of the PET imaging data.

In an illustrative example, the low threshold of the HEW is the same as the high threshold of the LEW, although having different HEW and LEW thresholds is also contemplated, e.g. providing some overlap or gap of the HEW and LEW data sets. In illustrative examples herein, the single threshold for both the HEW and LEW is 511 keV corresponding to the energies of the two oppositely directed gamma rays that result from an electron-positron annihilation event. Thus, in the illustrative example, the at least one electronic processor 20 is programmed to separate imaging data that is less than 511 keV into the LEW image and imaging data that is approximately or greater than 511 keV into the HEW image. The imaging data can be assigned to the LEW image when at least one of the gammas in the detected pair has energy below the threshold. For the HEW image, both gammas in the detected pair need to be above energy threshold for assignment thereto.

In another embodiment, the image acquisition device 12 comprises the SPECT imaging device, and is configured, or controlled by the at least one electronic processor 20, to acquire SPECT imaging data. Rather than being based on approximately 511 keV, the cut-off between the first and second energy windows is based on the true energy value of the SPECT radiopharmaceutical isotope administered to the patient prior to the imaging session. The at least one electronic processor 20 is programmed to separate the SPECT imaging data that is less than a true energy value of the SPECT radiopharmaceutical isotope administered to the patient prior to the imaging session into the LEW image and imaging data that is greater than the true energy value into the HEW image.

At 104, the at least one electronic processor 20 is programmed to generate a fraction of true counts (or events) in the generated intermediate images and a fraction of scatter counts (or events) in the generated intermediate images. In some embodiments, the at least one electronic processor 20 is programmed to simulate acquisition of the acquired imaging data from an estimated true image with an energy distribution or histogram having a known contribution of true and scatter counts to estimate the respective fractions. In some examples, the simulation operation uses a Monte Carlo simulator. This approach is premised on the expectation that the HEW image should have relatively low contribution from scatter since the positron-electron annihilation event outputs 511 keV gamma rays (or the energy value of the SPECT radiopharmaceutical isotope), and inelastic scatter events are expected to decrease the energy of these 511 keV gamma rays (or the energy value of the SPECT radiopharmaceutical isotope). From this simulation operation, the at least one electronic processor 20 is programmed to generate the fraction of true counts and the fraction of scatter counts.

In another embodiment, the at least one electronic processor 20 is programmed to fit the imaging data to a one-dimensional true counts energy distribution and a one-dimensional scatter counts distribution. In some examples, the one-dimensional true counts energy distribution comprises a Gaussian distribution and the one-dimensional scatter counts distribution comprises a polynomial distribution, although use of other parameterized distributions is contemplated. The fitted true and scatter energy distributions can then be used to estimate the fraction of true counts and the fraction scatter counts.

At 106, the at least one electronic processor 20 is programmed to generate a scatter estimate image from the intermediate images and from the fraction of true counts and the fraction of scatter counts in the intermediate images. With the fraction of true counts in the HEW image versus the LEW image, and the fraction of scatter counts in the HEW image versus the LEW image, estimated via simulation or energy distribution fitting, the at least one electronic processor 20 is then programmed to generate the scatter estimate image based on the high energy window image, the low energy window image, and the fractions. The scatter estimate image (or individual voxel values of the scatter estimate image) is generated by Equation 1:

$$s = s_H + s_L = \frac{r_S + 1}{r_T - r_S}(r_T y_L - y_H) \quad (1)$$

where s represents the scatter estimate image, $s_H$ represents scatter contribution events from the high energy window; $s_L$ represents scatter contribution events from the low energy window; $r_T$ represents the ratio of true events in the high energy window image versus the low energy window image; $r_S$ represents the ratio of scatter events in the high energy window image versus the low energy window image; $y_H$ represents the high energy window image, and $y_L$ represents the low energy window image.

In other embodiments, the simulating and the reconstructing of the scatter estimate image includes iteratively compensating the high energy window image for scatter using the scatter estimate image and repeating the simulating and reconstructing of the scatter estimate image. The iteratively inputting is repeated until a stopping criterion is met.

At 108, the at least one electronic processor 20 is programmed to forward project the scatter estimate image to generate a scatter projections estimate. This can be performed using any suitable forward projection operation or algorithm.

At 110, the at least one electronic processor 20 is programmed to reconstruct a final image from the imaging data. In some embodiments, the reconstruction of the final image is performed with scatter compensation using the scatter projections estimate. In one example, the final image is reconstructed from all imaging data with scatter compensation using the scatter projections estimate. In another example, the final image is reconstructed from the counts of the imaging data with energies above the high energy window threshold with scatter compensation using the scatter projections estimate. In some embodiments, the scatter estimate image can be subtracted from the image reconstructed using all the imaging data without scatter correction to realize scatter correction and therefore generate the final reconstructed image.

At 112, the at least one electronic processor 20 is programmed to control the display device 24 to display the clinical image. In some examples, the at least one electronic processor 20 is programmed to control the non-transitory storage media 26 to store the clinical image in a suitable database (e.g., a Picture Archiving and Communications System).

Figure 3:
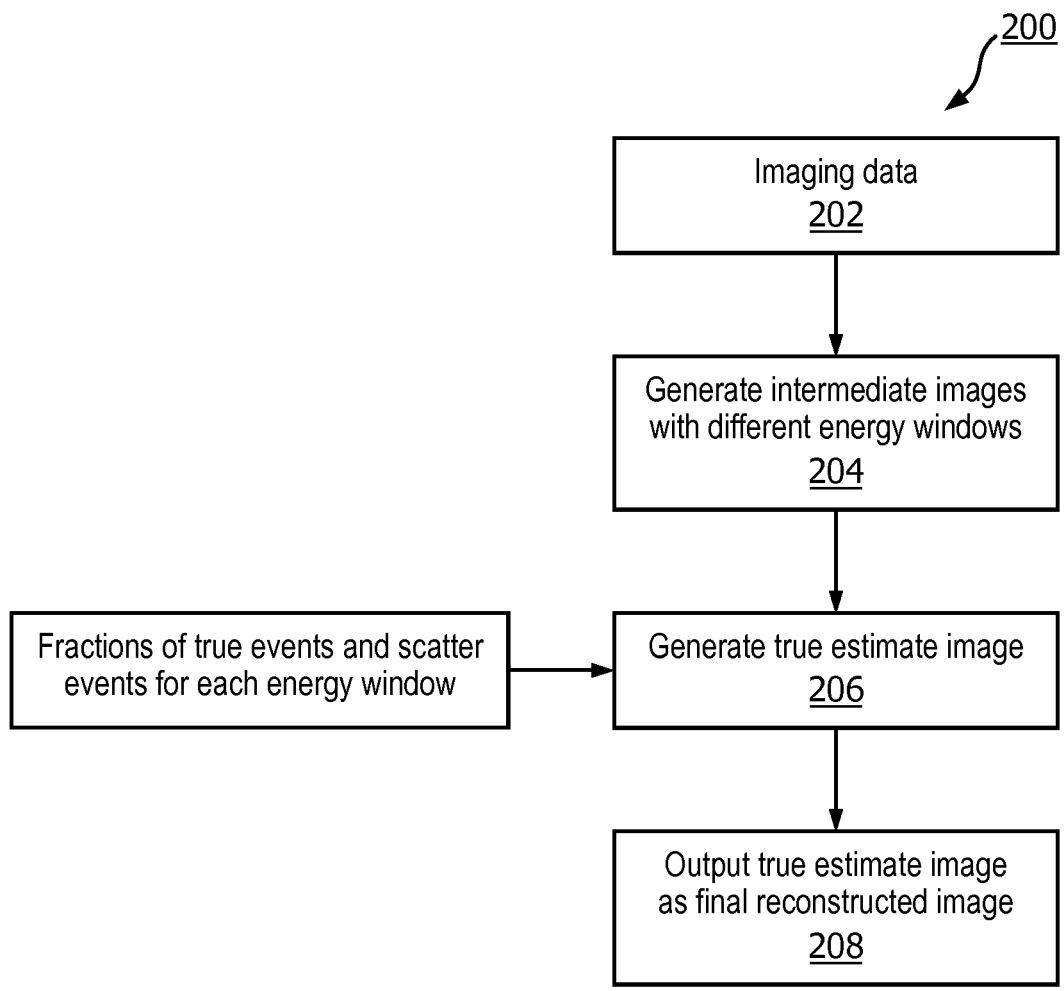
FIGS. 3-7 show other exemplary flow chart operations of the system of FIG. 1.

FIGS. 3-7 show other exemplary flowcharts of other embodiments of the image reconstruction method 100. With reference to FIG. 3, another illustrative embodiment of the image reconstruction method 200 is diagrammatically shown as a flowchart. At 202, imaging data is acquired from the image acquisition device 12. At 204, intermediate images with different energy windows are generated from the acquired imaging data. At 206, a true estimate image is generated from the intermediate images and fractions of true events and scatter events for each window. These fractions are known and can be retrieved, for example, from the non-transitory storage media 26. At 208, the generated true estimate image is output (e.g., displayed on the display device 24 or stored in the non-transitory storage media 26) as a final reconstructed image.

Figure 4:
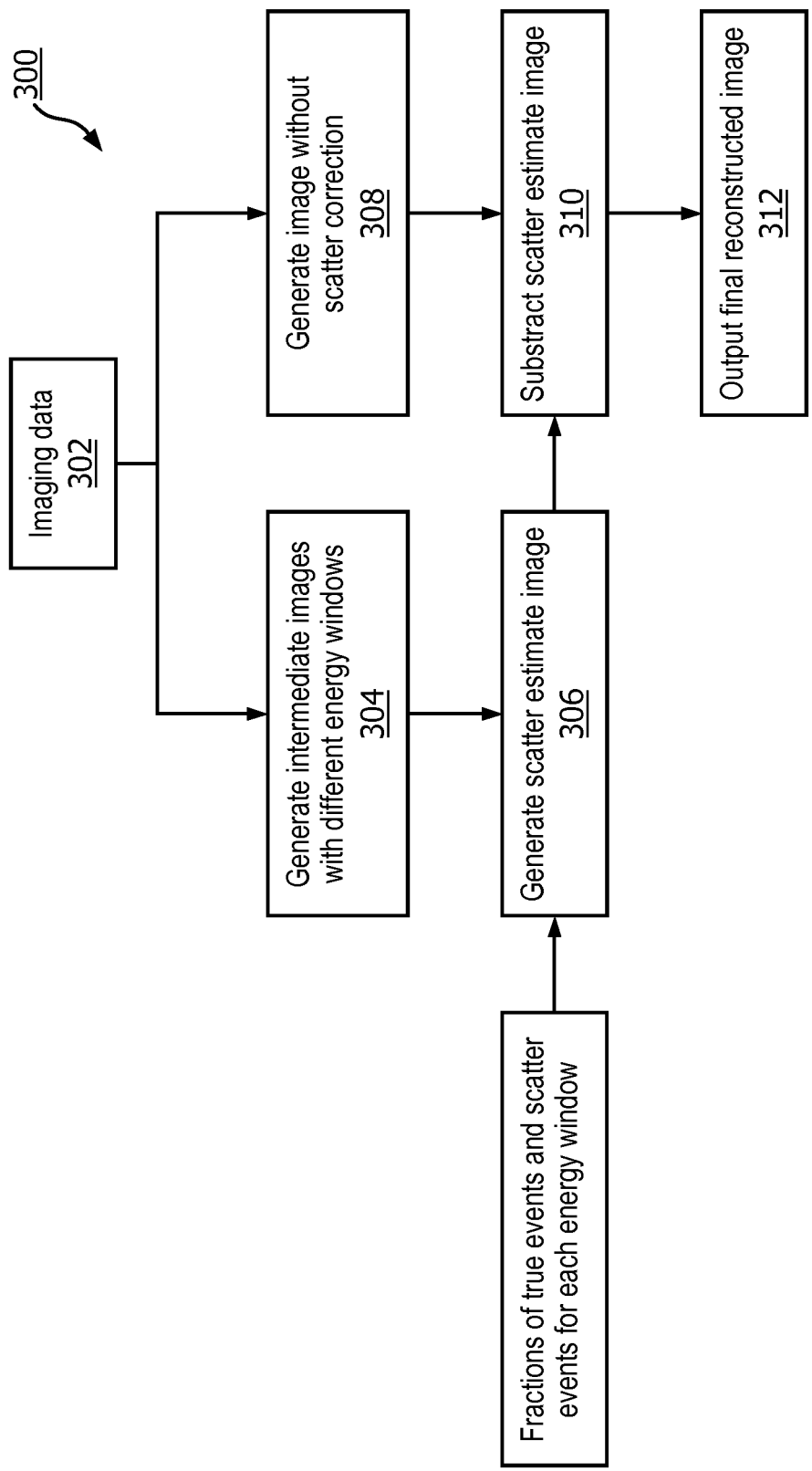

With reference to FIG. 4, another illustrative embodiment of the image reconstruction method 300 is diagrammatically shown as a flowchart. At 302, imaging data is acquired from the image acquisition device 12. At 304, intermediate images with different energy windows are generated from the acquired imaging data. At 306, a scatter estimate image is generated from the intermediate images and fractions of true events and scatter events for each window. These fractions are known and can be retrieved, for example, from the non-transitory storage media 26. At 308, an image is generated without scatter correction. At 310, the scatter estimate image (generated at 306) is subtracted from the image without scatter correction (generated at 308) to generate a final reconstructed image. At 312, the generated final reconstructed image is output (e.g., displayed on the display device 24 or stored in the non-transitory storage media 26).

Figure 5:
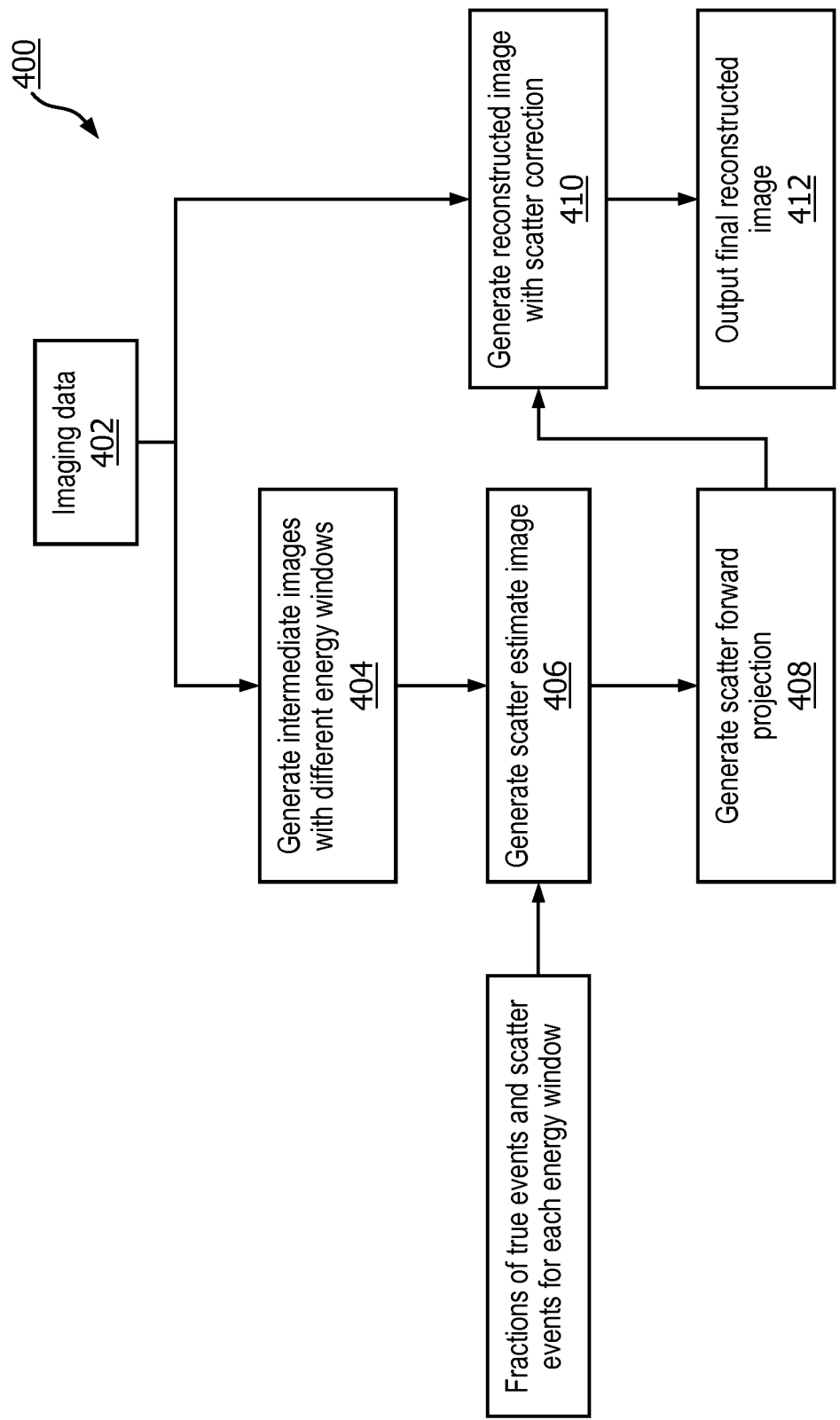

With reference to FIG. 5, another illustrative embodiment of the image reconstruction method 400 is diagrammatically shown as a flowchart. At 402, imaging data is acquired from the image acquisition device 12. At 404, intermediate images with different energy windows are generated from the acquired imaging data. At 406, a scatter estimate image is generated from the intermediate images and fractions of true events and scatter events for each window. These fractions are known and can be retrieved, for example, from the non-transitory storage media 26. At 408, a scatter forward projection is generated from the scatter estimate image. At 410, a reconstructed image with scatter correction is generated using the scatter forward projection. At 412, the generated final reconstructed image is output (e.g., displayed on the display device 24 or stored in the non-transitory storage media 26).

Figure 6:
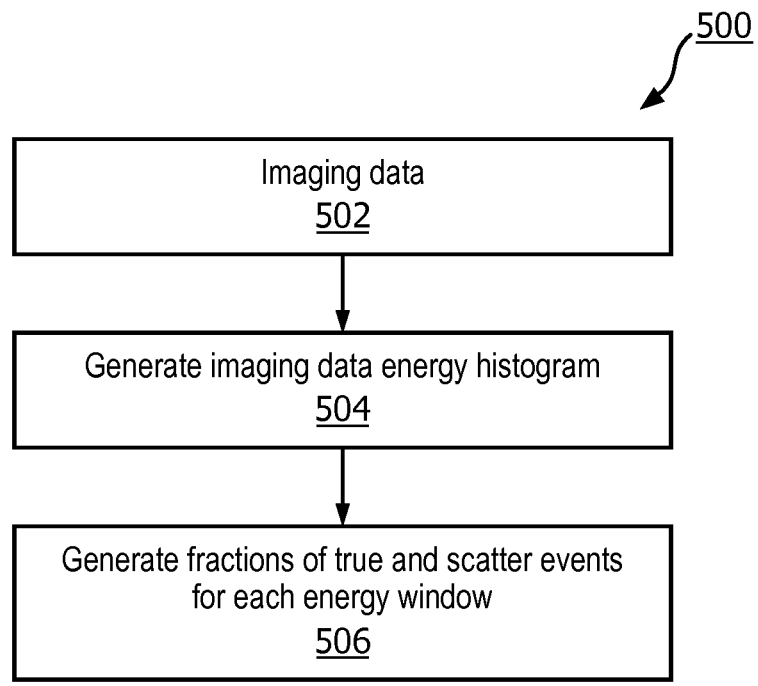
Figure 7:
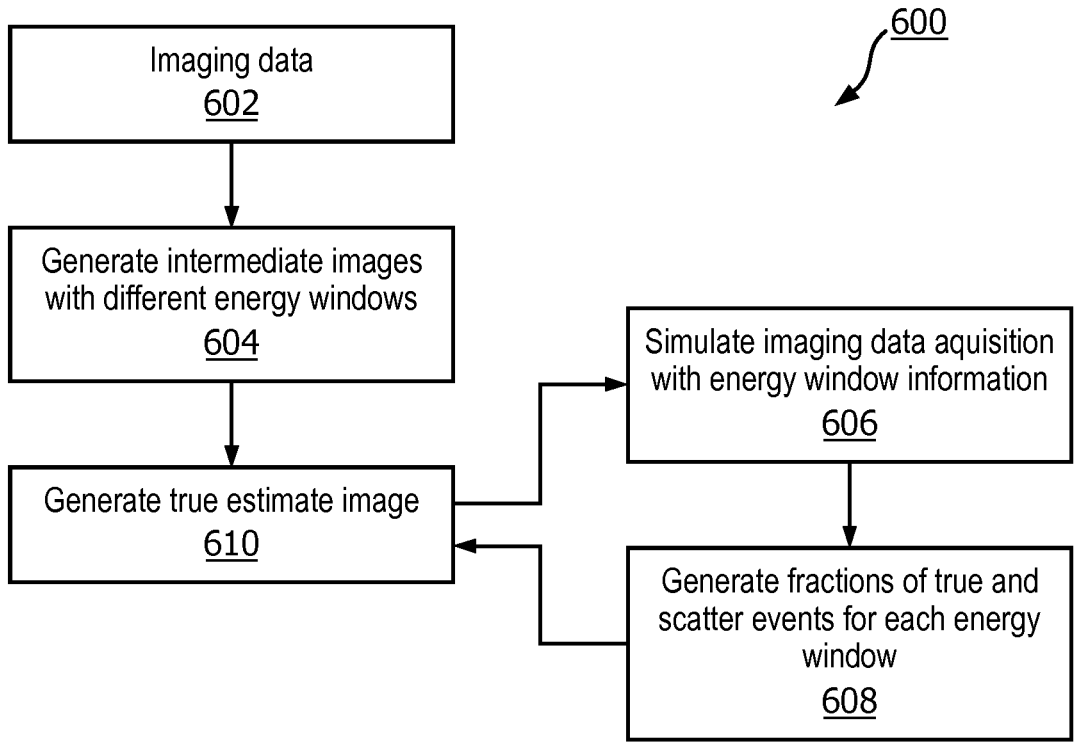

FIGS. 6 and 7 show exemplary flow charts to generate the fraction of true counts and the fraction of scatter counts (described at 104, 206, 306, and 406). With reference to FIG. 6, at 502, imaging data is acquired from the image acquisition device 12. At 504, an imaging data energy histogram for energy windows of the acquired imaging data is generated. At 506, the fractions of true events and scatter events are generated for each energy window.

With reference to FIG. 7, at 602, imaging data is acquired from the image acquisition device 12. At 604, intermediate images with different energy windows are generated from the acquired imaging data. At 606, the acquisition of the imaging data is simulated with information about the different energy windows. At 608, the fractions of true events and scatter events are generated for each energy window. At 610, a true estimate image is generated from the intermediate images and the fractions of true events and scatter events.

Example

The acquired imaging data are divided based on event energy into HEW and LEW and reconstructed respectively into HEW and LEW images without scatter correction. The splitting energy can be 511 keV (including a margin dictated by the finite energy resolution of the detectors 17) for PET imaging although other splitting energies can be chosen (e.g., the true energy value of the SPECT radiopharmaceutical isotope administered to the patient prior to the imaging session). Each of HEW and LEW data contains both non-scattered (true) coincidence events and scattered coincidence events. The image voxel values in the HEW and LEW images can be represented as $y_H$ and $y_L$, and these voxel values can be determined according to Equation 2:

$$y_H = t_H + s_H$$

$$y_L = t_L + s_L \qquad (2)$$

where $y_H$ represents the value of a voxel of the high energy window image, $y_L$ represents the value of the corresponding voxel of the low energy window image, $t_H$ represents true contribution events from the high energy window image at that voxel, $t_L$ represents true contribution events from the low energy window image at that voxel, $s_H$ represents scatter contribution events from the high energy window at that voxel; and $s_L$ represents scatter contribution events from the low energy window at that voxel.

The ratio of true events in the high energy window image versus the low energy window image and the ratio of scatter events in the high energy window image versus the low energy window image are defined according to Equation 3:

$$r_T = t_H/t_L$$

$$r_S = s_H/s_L, \qquad (3)$$

where $r_T$ represents the ratio of true events in the high energy window image versus the low energy window image and $r_S$ represents the ratio of scatter events in the high energy window image versus the low energy window image.

Once these ratios are determined, the true estimate can be calculated according to Equation 4:

$$t = t_H + t_L = \frac{r_T + 1}{r_T - r_S}(y_H - r_S y_L), \qquad (4)$$

where t represents the true estimate image. This true estimate image can be used directly as the final reconstructed image.

In some embodiments, the above true estimate image is derived from a combination of the HEW and LEW images. Since each of the HEW and LEW images contains partial coincidence events from the measurement, it is expected that the noise in the image could be reduced if all coincidence events are used for the reconstruction. The following scheme estimates scatter contribution from the HEW and LEW images and a higher resolution, and lower noise image can be reconstructed using all the coincidence events with scatter correction using the scatter estimate.

The scatter estimate is calculated according to Equation 1 (reproduced below)

$$s = s_H + s_L = \frac{r_S + 1}{r_T - r_S}(r_T y_L - y_H) \qquad (1)$$

where s represents the scatter estimate.

In some embodiments, the scatter estimate image can be subtracted from the image reconstructed using all the imaging data without scatter correction to realize scatter correction and therefore generate the final reconstructed image.

To apply these equations, estimates of the ratios $r_T$ and $r_S$ are determined. In general, $r_T > r_S$ with an energy split point at any suitable point. As an initial estimate, if the energy window is symmetric over 511 keV, and the energy split point is right at 511 keV, then $r_T$ is approximately 1/3, assuming that the 2-D energy histogram distribution for true coincidence counts is a 2-D Gaussian function; $r_S$ can be set to a lower value, e.g., zero as the initial estimate. If $r_S$ is 0, then $4y_H$ is the true estimate, as indicated by Equation 4.

If the ratios $r_T$ and $r_S$ are shift invariant, then the local ratios at any location are the same as the ratios from the total counts. The ratios $r_T$ and $r_S$ can be found from the energy histogram of the coincident gammas. In some examples, the energy distribution probability function of one photon is represented according to Equation 5:

$$f(x)=s(x)+t(x), \quad (5)$$

where s(x) is from scattered contribution, and t(x) is contribution from non-scattered events. In one approach, the scatter contribution function s(x) is assumed to be a polynomial, and t(x) is assumed to be a Gaussian function symmetric at 511 keV. The energy distributions of the singles of the acquired PET imaging data can then be fitted to Equation (5) using a parameterized Gaussian for t(x) where the parameters are, e.g., mean, amplitude, and variance of the Gaussian, and using a parameterized low order polynomial function for s(x), where the parameters are the coefficients of the polynomial terms (e.g., using a second order polynomial $s(x)=A_0+A_1x+A_2x^2$ then the parameters are $A_0$, $A_1$, and $A_2$). Thus, in this example the fit would have six parameters: Gaussian mean, amplitude, and variance, along with coefficients $A_0$, $A_1$, $A_2$. This could be reduced by making the physically plausible assumption that the Gaussian mean is 511 keV. The fitting of the singles energy distribution to the parameterized Equation (5) can employ any suitable optimization algorithm, e.g. a Levenberg-Marquardt or other least squares optimization.

The PET imaging data comprise coincidence counts, with each coincidence count being defined by two temporally coincident singles (within a coincidence time window). Expressing a coincidence count as a first single event designated "A" and a second temporally coincident single event designated "B", a 2-D energy histogram is represented as the multiplication of the energy spectrums for events A and B according to Equation 6:

$$f(x,y)=(s(x)+t(x))(s(y)+t(y)), \quad (6)$$

where x and y are photon energy of singles events A and B, respectively. Equation 6 can be expanded as represented in Equation 7:

$$f(x,y)=s(x)s(y)+s(x)t(y)+s(y)t(x)+t(x)t(y), \quad (7)$$

In Equations (5) and (6), s(x) represents the scatter contribution from a first radiation event x, s(y) represents the scatter contribution from a second radiation event y, t(x) represents the true contribution from the first radiation event x, and t(y) represents the true contribution from the second radiation event y. The first term s(x)s(y) represents events in which both the photons of the coincident pair are scattered; the second term s(x)t(y) and the third term s(y)t(x) represent events in which only one photon of the coincident pair is scattered; and the last term t(x)t(y) represents non-scattered coincidence events.

Voxel counts collected within the HEW are represented by Equation 8:

$$Y_H = \int_{E_C}^{E_2}\int_{E_C}^{E_2} s(x)s(y)+s(x)t(y)+s(y)t(x)+t(x)t(y)dydx, \quad (8)$$

where $Y_H$ represents the high energy window image, $E_2$ represents a maximum energy limit for the high energy window image, and $E_c$ represents separation between HEW and LEW energy ranges.

From Equation 8, the true coincidence contribution for the HEW is represented as Equation 9:

$$T_H = \int_{E_C}^{E_2}\int_{E_C}^{E_2} t(x)t(y)dydx, \quad (9)$$

and the scatter coincidence contribution for the HEW is represented as Equation 10:

$$S_H=Y_H-T_H. \quad (10)$$

Similarly, voxel counts collected within the LEW are represented by Equation 11:

$$Y_L = \int_{E1}^{E_C}\int_{E1}^{E_c} s(x)s(y)+s(x)t(y)+s(y)t(x)+t(x)t(y)dydx \quad (11)$$

where $Y_L$ represents the low energy window image; and $E_1$ represents a minimum energy limit for the low energy window image.

From Equation 11, the true coincidence contribution for the LEW is represented as Equation 12:

$$T_L = \int_{E1}^{E_c}\int_{E1}^{E_C} t(x)t(y)dydx \quad (12)$$

where $T_L$ represents the contribution of true events in the LEW image.

From Equation 12, the scatter coincidence contribution for the LEW is represented as Equation 13:

$$S_L=Y_L-T_L \quad (13)$$

where $S_L$ represents the contribution from scatter events in the LEW image.

Then from Equation (3) the ratio $r_T=T_H/T_L$ and the ratio $r_S=S_H/S_L$. It will be noted that in this approach these ratios can be obtained without Monte Carlo simulation. In a variant embodiment, Monte Carlo simulation is used to refine these initial ratio estimates.

The disclosure has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A non-transitory computer-readable medium storing instructions readable and executable by a workstation including at least one electronic processor to perform an image reconstruction method, the method comprising:
generating, from received imaging data, a plurality of intermediate images reconstructed without scatter correction from data partitioned into different energy windows;
generating a fraction of true counts and a fraction of scatter events in the generated intermediate images;

generating a final reconstructed image from the intermediate images, the fraction of true counts in the intermediate images, and the fraction of scatter counts in the intermediate images; and at least one of controlling the non-transitory computer readable medium to store the final image and control a display device to display the final image.

2. The non-transitory computer-readable medium according to claim 1, wherein the method further includes:

generating a scatter estimate image from the fraction of true counts and the fraction of scatter counts in the intermediate images;

forward-projecting the scatter estimate image to generate a scatter projections estimate;

reconstructing the final image from the imaging data with scatter correction using the scatter projections estimate; and at least one of controlling the non-transitory computer readable medium to store the final image and control a display device to display the final image.

3. The non-transitory computer-readable medium of claim 2, wherein the final image is reconstructed from all imaging data with scatter compensation using the scatter projections estimate.

4. The non-transitory computer-readable medium claim 2, wherein the final image is reconstructed from the counts of the imaging data with energies above an energy window threshold with scatter compensation using the scatter projections estimate for the imaging data.

5. The non-transitory computer-readable medium of claim 2, wherein the simulating and the reconstructing of the scatter estimate image further includes:

iteratively compensating the estimated true image for scatter using the scatter estimate image and repeating the simulating and reconstructing of the scatter estimate image.

6. The non-transitory computer-readable medium of claim 5, wherein the iteratively inputting is repeated until a stopping criterion is met.

7. The non-transitory computer-readable medium of claim 2, wherein the generating of the fractions of true counts and fractions of scatter counts includes:

simulating acquisition of the acquired imaging data from an estimated true image with an energy distribution having a known contribution of true and scatter counts.

8. The non-transitory computer-readable medium of claim 7, wherein the simulation operation uses a Monte Carlo simulator.

9. The non-transitory computer-readable medium of claim 2, wherein generating the final reconstructed image further includes:

subtracting the scatter estimate image from the intermediate image to generate the final reconstructed image.

10. The non-transitory computer-readable medium of claim 2, wherein the generating of the fractions of true counts and the fractions of scatter counts includes:

fitting the PET imaging data to a one-dimensional true counts energy distribution and a one-dimensional scatter counts distribution; and generating the fractions of true counts and the fractions of scatter counts based on the fitted one-dimensional true counts and scatter counts distributions.

11. The non-transitory computer-readable medium of claim 10, wherein the one-dimensional true counts energy distribution comprises a Gaussian distribution and the one-dimensional scatter counts distribution comprises a polynomial distribution.

12. The non-transitory computer-readable medium of claim 11, wherein the scatter estimate image is given by $$s = s_H + s_L = \frac{r_S + 1}{r_T - r_S}(r_T y_L - y_H)$$

where s represents the scatter estimate image, $s_H$ represents scatter contribution events from the high energy window; $s_L$ represents scatter contribution events from the low energy window; $r_T$ represents the ratio of true events in the high energy window image versus the low energy window image; $r_S$ represents the ratio of scatter events in the high energy window image versus the low energy window image; $y_H$ represents the high energy window image, and $y_L$ represents the low energy window image.

13. The non-transitory computer-readable medium of claim 1, wherein the received imaging data comprises positron emission tomography (PET) imaging data; and the intermediate images include a high energy window (HEW) for an intermediate image reconstructed without scatter correction from counts of the PET imaging data with energies above the HEW threshold and a low energy window (LEW), for an intermediate image reconstructed without scatter correction from counts of the PET imaging data with energies below the LEW threshold.

14. The non-transitory computer-readable medium of claim 13, wherein the method further includes:

separating the PET imaging data that is less than 511 keV into the low energy window image and imaging data that is greater than 511 keV into the high energy window image.

15. The non-transitory computer-readable medium of claim 1, wherein the received imaging data comprises single positron emission computed tomography (SPECT) imaging data; and the intermediate images include a high energy window (HEW) for an intermediate image reconstructed without scatter correction from counts of the SPECT imaging data with energies above a HEW threshold and a low energy window (LEW) for an intermediate image reconstructed without scatter correction from counts of the SPECT imaging data with energies below a LEW threshold.

16. The non-transitory computer-readable medium of claim 15, wherein the method further includes:

separating the SPECT imaging data that is less than a true energy value of the SPECT radiopharmaceutical isotope administered to the patient prior to the imaging session into the LEW image and imaging data that is greater than the true energy value into the HEW image.

17. A non-transitory computer-readable medium storing instructions readable and executable by a workstation including at least one electronic processor to perform an image reconstruction method, the method comprising:

generating, from received imaging data, a plurality of intermediate images reconstructed without scatter correction from data partitioned into different energy windows;

generating a fraction of true counts and a fraction of scatter counts in the generated intermediate images by operations including:
  generating an energy histogram of the imaging data;
  fitting the energy histogram to a one-dimensional true counts energy distribution and a one-dimensional scatter counts energy distribution; and
  generating the fraction of true counts and the fraction of scatter counts based on the fitted one-dimensional true counts and scatter counts distributions forward-projecting the scatter estimate image to generate a scatter projections estimate;
reconstructing the final image from the imaging data with scatter correction using the scatter projections estimate; and
at least one of controlling the non-transitory computer readable medium to store the final image and control a display device to display the final image.

18. The non-transitory computer-readable medium of claim 17, wherein the one-dimensional true counts energy distribution comprises a Gaussian distribution and the one-dimensional scatter counts distribution comprises a polynomial distribution.

19. A non-transitory computer-readable medium storing instructions readable and executable by a workstation including at least one electronic processor to perform an image reconstruction method, the method comprising:
  generating, from received imaging data, a plurality of intermediate images reconstructed without scatter correction from data partitioned into different energy windows;
  generating a fraction of true counts and a fraction of scatter counts in the generated intermediate images by simulating acquisition of the acquired imaging data from an estimated true image with an energy distribution having a known contribution of true and scatter counts to the energy windows;
  forward-projecting the scatter estimate image to generate a scatter projections estimate;
  reconstructing the final image from the imaging data with scatter correction using the scatter projections estimate; and
  at least one of controlling the non-transitory computer readable medium to store the final image and control a display device to display the final image.

20. The non-transitory computer-readable medium of claim 19, wherein the simulation operation uses a Monte Carlo simulator.

* * * * *